United States Patent Office 3,310,475
Patented Mar. 21, 1967

3,310,475
METHOD FOR PRODUCING L-ASPARTIC ACID
Saburo Yamatodani, Minoo, Atsushi Kakinuma, Osaka, and Tuneo Kanamaru, Nishinomiya, Japan, assignors to Takeda Chemical Industries, Ltd., Osaka, Japan
No Drawing. Filed Feb. 23, 1965, Ser. No. 434,649
Claims priority, application Japan, Feb. 24, 1964, 39/9,967
8 Claims. (Cl. 195—30)

This invention relates to a method for producing L-aspartic acid and, more concretely, to a method for producing L-aspartic acid which comprises incubating Pseudomonas A–12, its variants or their mutants in a culture medium containing maleic acid as the sole carbon source, and then allowing thus obtained culture broth to react with ammonium fumarate in aqueous solution thereof. The present invention is based on the finding that Pseudomonas A–12, a new strain isolated by the present inventors from soil near Osaka, Japan, utilizes maleic acid as the sole carbon source, and that the strain gains in a culture broth a remarkably enhanced ability to convert ammonium fumarate to L-aspartic acid when cultivated in a culture medium containing maleic acid as the sole carbon source, although the strain essentially lacks such ability when a conventional nutrient-rich medium lacking maleic acid is employed for the incubation. According to the invention, the L-aspartic acid is produced from ammonium fumarate by the use of the culture broth of this strain as the source of aspartase.

The present inventors are the first to establish that a microorganism can acquire a high ability to form L-aspartic acid from fumaric acid in a culture medium containing maleic acid as the sole carbon source.

When it is taken into consideration that maleic acid is a non-natural material and does not appear in nature as such, it is quite an unexpected finding that maleic acid serves to enhance the ability of microorganisms to participate in the conversion of fumaric acid to L-aspartic acid, the conversion having hitherto been effected by catalytic action of an enzyme called aspartase.

The object of this invention is to provide an industrially advantageous method for producing L-aspartic acid from ammonium fumarate by the use of bacterial aspartase.

The object is realized by incubating Pseudomonas A–12 in a culture medium containing maleic acid as the sole carbon source—the first step, and then by allowing thus obtained culture broth to react with ammonium fumarate in aqueous solution thereof under the conditions hereinafter set forth—the second step.

The strain Pseudomonas A–12 employed in this invention has the following microbiological characteristics:

I. *Morphological characteristics:*

Straight rods with rounded ends, occurring singly, 0.5 to 0.8 by 1.3 to 3.0 microns. Motile. No endospores. Gram-negative.

II. *Cultural characteristics:*

(1) Agar slant; abundant growth, spreading, yellowish white, glistening, butyraceous, medium unchanged.
(2) Agar colonies; circular, 5 to 6 mm. in diameter, entire, convex, smooth, glistening.
(3) Nutrient broth; thickly turbid, moderate sedimentation, no growth on surface.
(4) Gelatin stab; no liquefaction, filiform, medium unchanged.

III. *Physiological characteristics:*

(1) Temperature for growth; optimum 23–37° C., maximum 42° C., minimum 10° C.
(2) pH for growth; limits pH 5.0–10.0, optimum pH 6.0–8.0.
(3) Relation to free oxygen; aerobic.
(4) Litmus milk; alkaline, litmus not reduced.
(5) Indole not produced.
(6) Ammonia produced from peptone.
(7) Hydrogen sulfide slightly produced.
(8) Nitrites produced from nitrates.
(9) Methyl-red test; negative.
(10) Voges-Proskauer test; negative.
(11) Starch not hydrolyzed.
(12) Catalase; slightly positive.
(13) Urease; positive.
(14) Fermentation of sugars; acid from glucose, fructose and mannose, but no gas.
(15) Maleate, fumarate, citrate and p-hydroxybenzoate are utilized as the sole carbon source with the production of water-soluble fluorescent pigment.

IV. *Source:*

Isolated from uncultivated soil.

Comparison of the above properties with the description in "Bergey's Manual of Determinative Bacteriology" 7th Edition, shows that this strain belongs to the genus Pseudomonas, and that there is no species already established to which the strain is to be classified.

Mutants or variants of Pseudomonas A–12, regardless of whether the variation may be caused spontaneously or artificially, for example, by X-ray, ultraviolet-ray or by the action of chemical reagents, can be employed in the method of this invention, as long as the culture broth is capable of accumulating L-aspartic acid by reaction with ammonium fumarate.

By the method of this invention, a large amount of L-aspartic acid is obtained. For example, the yield of L-aspartic acid accumulated in the reaction mixture and the amount of consumed substrate in terms of fumaric acid are shown respectively in Table 2. In these tests, the culture broths obtained by incubating Pseudomonas A–12 in three kinds of culture medium shown in Table 1 were allowed to react respectively with ammonium fumarate at 37° C. and pH 8, the initial concentration of the substrate being 10% or 20% (weight/volume) in terms of fumaric acid, and the concentration of culture broths being 30% (volume/volume).

TABLE 1
[Composition of culture medium]

| | | |
|---|---|---|
| Culture medium A | Maleic anhydride, g | 8.45 |
| | Aqueous ammonia (28%), ml | 12.0 |
| | $K_2HPO_4$, g | 0.5 |
| | $KH_2PO_4$, g | 0.5 |
| | $MgSO_4 \cdot 7H_2O$, g | 0.2 |
| | Water, ml | 1,000 |
| | pH | 7.5 |
| Culture medium B | Fumaric acid, g | 10.0 |
| | Aqueous ammonia (28%), ml | 12.0 |
| | $K_2HPO_4$, g | 0.5 |
| | $KH_2PO_4$, g | 0.5 |
| | $MgSO_4 \cdot 7H_2O$, g | 0.2 |
| | Water, ml | 1,000 |
| | pH | 7.5 |
| Culture medium C | Glucose, g | 19.0 |
| | Peptone, g | 5.0 |
| | Meat extract, g | 5.0 |
| | Water, ml | 1,000 |
| | pH | 7.5 |

NOTE.—"g"=gram or grams. "ml"=milliliters. Percent is by weight.

TABLE 2

| Period of the reaction (hours) | Culture broth from culture medium— | | | | | | | | | | | |
|---|---|---|---|---|---|---|---|---|---|---|---|---|
| | A | | | | B | | | | C | | | |
| | Period of incubation (hours) | | | | | | | | | | | |
| | 22 | | 46 | | 22 | | 46 | | 22 | | 46 | |
| | (I) | (II) | (I) | (II) | (I) | (II) | (I) | (II) | (I) | (II) | (I) | (II) |

Initial concentration of substrate in terms of fumaric acid (percent):

| | (I) | (II) | (I) | (II) | (I) | (II) | (I) | (II) | (I) | (II) | (I) | (II) |
|---|---|---|---|---|---|---|---|---|---|---|---|---|
| 10 — 12 | 101 | 68 | 84 | 49 | 72 | 37 | 90 | 50 | 86 | 2 | 53 | 3 |
| 24 | 106 | 100 | 105 | 87 | 105 | 81 | 104 | 88 | 94 | 7 | 91 | 7 |
| 48 | 108 | 118 | 107 | 113 | 108 | 117 | 107 | 113 | 96 | 14 | 95 | 15 |
| 96 | 108 | 127 | 108 | 123 | 109 | 130 | 109 | 124 | 98 | 32 | 98 | 40 |
| 120 | 108 | 128 | 108 | 124 | 109 | 130 | 109 | 124 | 99 | 37 | 100 | 47 |
| 20 — 12 | 84 | 7 | 101 | 29 | 73 | 3 | 96 | 31 | 131 | 0 | 84 | 0 |
| 24 | 129 | 40 | 148 | 64 | 111 | 7 | 136 | 24 | 156 | 0 | 144 | 0 |
| 48 | 187 | 81 | 190 | 117 | 147 | 14 | 174 | 32 | 165 | 0 | 167 | 0 |
| 96 | 199 | 179 | 196 | 187 | 175 | 21 | 191 | 53 | 172 | 0 | 174 | 0 |
| 120 | 201 | 234 | 202 | 219 | 177 | 27 | 193 | 63 | 173 | 0 | 174 | 0 |

(I): Amount of consumed fumaric acid (mg./ml.).
(II): Yield of L-aspartic acid (mg./ml.) (mg./ml.=milligrams per milliliter).

It is shown in Table 2 that the culture broth from the culture medium containing either maleic or fumaric acid is capable of converting fumaric acid as the substrate into L-aspartic acid in a higher yield than the yield realized by using the culture broth obtained from the ordinary nutrient-rich culture medium which contains neither maleic nor fumaric acid and that there is no difference in the yield of L-aspartic acid between the cases of using the culture broth from the culture medium containing maleic acid and that from the culture medium containing fumaric acid under the reaction with the initial concentration of ammonium fumarate 10% (weight/volume) in terms of free acid. However, when the reaction is carried out with the initial concentration of ammonium fumarate 20% (weight/volume) in terms of free acid, it is shown in Table 2 that the culture broth from the ordinary culture medium cannot produce L-aspartic acid at all, and that the culture broth from the culture medium containing maleic acid is capable of producing a higher yield of L-aspartic acid than that from the culture medium containing fumaric acid.

The first step in the method of this invention is carried out by incubating Pseudomonas A–12 in a culture medium containing maleic acid as the sole carbon source. The culture medium contains, in addition, digestible nitrogen sources, and preferably, inorganic substances, trace elements such as calcium carbonate, magnesium sulfate, potassium phosphate, vitamins, etc. As the sole carbon source there may be employed maleic acid itself or its salts e.g. sodium maleate, potassium maleate, ammonium maleate, calcium maleate, etc., and/or its anhydride. The optimum concentration of maleic acid in the culture medium is between about 0.5% and 2.0% from the standpoint of both the growth of the microorganisms in the first step and the yield of L-aspartic acid in the second step in the present method.

As the nitrogen source, there may, for example, be various nitrogen compounds such as ammonium salts, nitrates, urea, aqueous ammonia.

From the viewpoint of industrial production, the use of liquid medium is preferable and the incubation is carried out either stationarily or in the manner of a submerged process with aeration and/or agitation. The pH of the culture medium, the incubation temperature and other conditions to be controlled are so adjusted that the aforementioned ability of the culture broth is maximal. Generally, the initial pH of the culture medium is preferably adjusted to within the range from 6.0 to 9.0, and the incubation temperature is in most cases from 20° C. to 40° C. The period required for incubation varies with the incubation conditions. Generally, it is preferable to continue the incubation for 12 to 48 hours.

By incubation as thus outlined, a culture broth having strong capacity for converting fumaric acid to L-aspartic acid is obtained.

The second step in the method of this invention is carried out by allowing the above-obtained culture broth to react with ammonium fumarate in aqueous solution thereof. The reaction is satisfactorily effected by bringing the culture broth into contact with ammonium fumarate in the aqueous solution. Practically, it may be carried out by adding ammonium fumarate or aqueous solution thereof to the culture broth, or by adding the culture broth to an aqueous solution of ammonium fumarate.

In the above-mentioned enzymic reaction, the ammonium fumarate is employed at a high concentration to inhibit growth of any microorganism which consumes once produced L-aspartic acid. As the culture broth employed as the source of aspartase in the method of this invention has a strong ability to produce L-aspartic acid, the ammonium fumarate can be contained in the reaction mixture in a high concentration, which is preferable from the industrial viewpoint. However, when the reaction is carried out in a reaction medium containing too large an amount of substrate, a prolonged period is required for the reaction. Therefore, from the viewpoint of the industrial production, the initial concentration of substrate in terms of fumaric acid should be between about 15% and 30% (weight/volume) relative to the whole reaction mixture.

Although the solubility of ammonium fumarate is about 20% (weight/volume) in water at 37° C., the reaction is carried out with satisfactory results in a heterogeneous reaction system due to the presence of ammonium fumarate in an amount exceeding the limit of solubility.

The reaction is preferably carried out at a temperature between 20° C. and 45° C. and at pH value between 6.0 and 9.0 under stationary or submerged conditions. The period for the reaction varies with concentration of substrate, the amount of culture medium as the source of aspartase, reaction temperature, etc. In general, 1 to 3 days are sufficient for the completion of the reaction.

In this enzymic reaction, it is not necessary to keep the reaction system from contamination by other microorganisms, since the high concentration of the substrate does not permit them to be alive in the reaction mixture.

The recovery of L-aspartic acid accumulated in the reaction mixture is carried out by generally known means for the separation of L-aspartic acid. For example, the recovery of the L-aspartic acid is carried out by eliminating the cells from the reaction mixture, followed by adjusting the pH to about 2.8 (the isoelectric point of L-aspartic acid) to precipitate L-aspartic acid. Ion-exchange resin or other adsorbents may also be used for the purpose of recovering the L-aspartic acid.

The following examples of presently-preferred embodiments are illustrative only and are not meant to limit the scope of this invention. Throughout the specification, the abbreviations "ml." and "g." mean respectively "milliliter(s)" and "gram(s)" and percent is weight/volume percent unless otherwise described.

EXAMPLE 1

One hundred milliliters of culture medium (pH 7.5) comprising 2.0% of ammonium maleate, 0.05% of $K_2HPO_4$, 0.05% of $KH_2PO_4$, 0.02% of $MgSO_4 \cdot 7H_2O$ and water is inoculated with Pseudomonas A-12 (ATCC 15915), and then the culture medium is incubated at 28° C. for 24 hours under shaking.

Thirty milliliters taken out of the culture broth so incubated is added to 70 ml. of an aqueous suspension of ammonium fumarate, the suspension being previously prepared by neutralizing 15 g. of fumaric acid with aqueous ammonia followed by further addition of water to make the total volume of the suspension 70 ml.

The mixture, after being adjusted to pH 8 by the addition of aqueous ammonia, is kept under stationary conditions at 37° C. for 48 hours, during which time an enzymic reaction is effected.

After completion of the enzymic reaction, the cells are removed from the reaction mixture, and then the remaining reaction solution is subjected to microbiological quantitative analysis employing *Leuconostoc mesenteroides* P60 to establish the presence of 16.8 g. of L-aspartic acid accumulated in the solution, which means 97.7% in terms of molar yield relative to the ammonium fumarate employed as the substrate. When the pH of the solution is lowered to 2.8 with hydrochloric acid, crystals of L-aspartic acid precipitate out. The crystals are collected and dried to give a yield of 14.8 g. The yield percentage of L-aspartic acid crystals is 88.1% relative to L-aspartic acid accumulated in the solution.

EXAMPLE 2

To 23 g. of ammonium fumarate (corresponding to 20 g. as free fumaric acid) is added water to make the total volume 50 ml., a substantial amount of ammonium fumarate remaining undissolved in the medium, forming an aqueous suspension. To the suspension is added 50 ml. of culture broth of Pseudomonas A-12 (ATCC 15915) prepared in the same manner as in Example 1, followed by adjusting the pH to 8 with aqueous ammonia to completely dissolve the suspended ammonium fumarate. The mixture is subjected to enzymic reaction at 37° C. for 48 hours under intermittent mild shaking.

After completion of the enzymic reaction, the cells are removed from the reaction mixture, and then the remaining reaction solution is subjected to the aforementioned microbiological quantitative analysis to show 22.5 g. of L-aspartic acid accumulated in the solution, which means 98.1% in terms of molar yield relative to the ammonium fumarate employed as the substrate. When the pH of the solution is lowered to 2.8 with hydrochloric acid, crystals of L-aspartic acid precipitate out. The crystals are collected and dried to give a yield of 20.0 g. The yield percentage of L-aspartic acid crystals is 88.9% relative to L-aspartic acid accumulated in the solution.

EXAMPLE 3

To 34.5 g. of ammonium fumarate (corresponding to 30 g. as free fumaric acid) is added water to make the total volume 50 ml., a considerable amount of ammonium fumarate remaining undissolved in the medium, forming an aqueous suspension. To the suspension is added 50 ml. of culture broth of Pseudomonas A-12 (ATCC 15915) prepared in the same manner as in Example 1, followed by adjusting the pH to around 8 with aqueous ammonia. The mixture is subjected to enzymic reaction at 37° C. for 72 hours under intermittent mild shaking, while the pH of the mixture is kept around 8 throughout the reaction period, the suspended ammonium fumarate dissolving completely.

After completion of the enzymic reaction, the cells are removed from the reaction mixture, and then the remaining reaction solution is subjected to aforementioned microbiological quantitative analysis to show 34.2 g. of L-aspartic acid accumulated in the solution, which means 99.4% in terms of molar yield relative to the ammonium fumarate employed as the substrate. When the pH of the solution is lowered to 2.8 with hydrochloric acid, crystals of L-aspartic acid precipitate out. The crystals are collected and dried to give a yield of 31.2 g. The yield percentage of L-aspartic acid crystals is 91.2% relative to L-aspartic acid accumulated in the solution.

Having thus disclosed the invention, what is claimed is:

1. A method for producing L-aspartic acid, which comprises incubating Pseudomonas A-12 (ATCC 15915) in a culture medium containing maleic acid as the sole carbon source and allowing thus obtained culture broth to react with ammonium fumarate in aqueous solution, the initial concentration of the substrate in terms of fumaric acid being about between 15% and 30% (weight/volume) relative to the whole reaction mixture.

2. A method for producing L-aspartic acid, which comprises incubating Pseudomonas A-12 (ATCC 15915) in a culture medium containing maleic acid as the sole carbon source and allowing thus obtained culture broth to react with ammonium fumarate in aqueous solution, the initial concentration of the substrate in terms of fumaric acid being about between 15% and 30% (weight/volume) relative to the whole reaction mixture, followed by recovering thus accumulated L-aspartic acid from the reaction mixture.

3. The method as claimed in claim 2, wherein the incubation is carried out in a culture medium containing between about 0.5% and 2.0% (weight/volume) of maleic acid under aerobic conditions at a temperature of between about 20° C. and 40° C. and at a pH value of between about 6.0 and 9.0.

4. The method as claimed in claim 2, wherein the reaction is carried out at a temperature of between about 20° C. and 45° C. and at a pH value of about 6.0 and 9.0.

5. The method as claimed in claim 2, wherein the Pseudomonas A-12 is in the form of a mutant thereof.

6. The method as claimed in claim 2, wherein the Pseudomonas A-12 is in the form of a variant thereof.

7. The method as claimed in claim 6, wherein the variant is in the form of a mutant thereof.

8. The method as claimed in claim 1, wherein the maleic acid is employed in the form of a member selected from the group consisting of alkali metal salt, ammonium salt, alkaline earth metal salt and anhydride thereof.

References Cited by the Examiner

UNITED STATES PATENTS 3,198,712  8/1965  Takahashi et al. _____ 195—30
3,214,345  10/1965  Chibata et al. _____ 195—30

FOREIGN PATENTS

38/6,592  5/1963  Japan.

A. LOUIS MONACELL, *Primary Examiner.*

L. M. SHAPIRO, *Assistant Examiner.*